United States Patent
Hassan-Ali et al.

(10) Patent No.: US 9,787,140 B2
(45) Date of Patent: Oct. 10, 2017

(54) WIRELESS POWER TRANSFER METHOD AND CIRCUIT

(71) Applicant: Tyco Electronics Corporation, Berwyn, PA (US)

(72) Inventors: Mudhafar Hassan-Ali, Petaluma, CA (US); Jason Larson, San Lorenzo, CA (US)

(73) Assignee: TE Connectivity Corporation, Berwyn, PA (US)

( * ) Notice: Subject to any disclaimer, the term of this patent is extended or adjusted under 35 U.S.C. 154(b) by 373 days.

(21) Appl. No.: 14/548,088

(22) Filed: Nov. 19, 2014

(65) Prior Publication Data

US 2016/0141881 A1 May 19, 2016

(51) Int. Cl.
| | |
|---|---|
| *H01F 27/42* | (2006.01) |
| *H01F 38/00* | (2006.01) |
| *H01F 37/00* | (2006.01) |
| *H02J 50/10* | (2016.01) |

(52) U.S. Cl.
CPC .................................. *H02J 50/10* (2016.02)

(58) Field of Classification Search
CPC .. H02J 7/025; H02J 5/005; H02J 17/00; H02J 50/12; H02J 50/10; H02J 50/80; H02J 50/90; H02J 50/40; H02J 50/60; H02J 50/20; H02J 7/0042; H02J 50/50; H02J 7/0054; H02J 50/00; H02J 50/27
See application file for complete search history.

(56) References Cited

U.S. PATENT DOCUMENTS

| | | | | |
|---|---|---|---|---|
| 6,414,485 | B1 * | 7/2002 | Kato .................. | G01R 33/3415 324/307 |
| 7,613,108 | B2 * | 11/2009 | Takehara .............. | G05B 9/02 370/216 |
| 2005/0052272 | A1 | 3/2005 | Tiebout | |
| 2010/0117454 | A1 * | 5/2010 | Cook .................... | G06K 7/0008 307/104 |
| 2011/0057608 | A1 * | 3/2011 | Smith ...................... | A61L 2/00 320/108 |
| 2011/0115303 | A1 * | 5/2011 | Baarman ................ | H02J 17/00 307/104 |

(Continued)

FOREIGN PATENT DOCUMENTS

CN            201185113 Y        1/2009

OTHER PUBLICATIONS

Tiebout, "Low-Power Low-Phase-Noise Differentially Tuned Quadrature VCO Design in Standard CMOS", IEEE Journal of Solid-State Circuits, vol. 36, No. 7, Jul. 2001.

(Continued)

*Primary Examiner* — Jared Fureman
*Assistant Examiner* — Esayas Yeshaw

(57) ABSTRACT

A power circuit for wirelessly communicating power to a receiving device includes one or more switches for coupling respective ends of different coils of a group of coils together to facilitate selectively connecting the coils in a series configuration, parallel configuration, or combination thereof. The circuit includes a controller configured to control a conduction state of each of the one or more switches, and power terminals in electrical communication with the coils through which a power signal flows.

21 Claims, 5 Drawing Sheets

(56) References Cited

U.S. PATENT DOCUMENTS

| | | | | |
|---|---|---|---|---|
| 2012/0212068 A1* | 8/2012 | Urano | ............... | H02J 5/005 |
| | | | | 307/104 |
| 2012/0313577 A1* | 12/2012 | Moes | ............... | H04B 5/0037 |
| | | | | 320/108 |
| 2013/0119910 A1* | 5/2013 | Marvin | ............... | H02P 27/00 |
| | | | | 318/434 |
| 2014/0035564 A1* | 2/2014 | Lee | ............... | G01D 5/204 |
| | | | | 324/207.12 |
| 2016/0181855 A1* | 6/2016 | Muurinen | ............... | H02J 7/025 |
| | | | | 320/108 |
| 2016/0190870 A1* | 6/2016 | Nagamine | ............... | H02J 5/005 |
| | | | | 307/52 |
| 2016/0197485 A1* | 7/2016 | Nirantare | ............... | H02J 5/005 |
| | | | | 307/104 |
| 2016/0254692 A1* | 9/2016 | Shcherbatko | ............... | H02J 7/025 |
| | | | | 307/104 |

OTHER PUBLICATIONS

Jang et al., "HF-Band Wireless Power Transfer System-Concept, Issues, and Design," Progress in Electromagnetics Research, vol. 124, 211-231, 2012.

Mirbozorgi et al., "A Smart Multicoil Inductively Coupled Array for Wireless Power Transmission," *IEEE Transactions on Industrial Electronics*, vol. 61, No. 11, Nov. 2014, pp. 6061-6070, stated as being published Feb. 25, 2014.

Jang et al., "HF-Band Wireless Power Transfer System: Concept, Issues and Design," *Progress in Electromagnetics Research*, vol. 124, 2012, pp. 211-231.

\* cited by examiner

WIRELESS POWER TRANSFER METHOD AND CIRCUIT

BACKGROUND

I. Field

The present invention relates generally to power transmission systems. More specifically, the present invention relates to methods and circuits for wirelessly transferring power.

II. Description of Related Art

In portable electronics, a wireless power transmission circuit may be utilized to charge a portable device. For example, an electronic toothbrush system may include a portable toothbrush and a charging base into which the portable toothbrush is placed to facilitate charging a battery in the toothbrush. In such system, inductive or magnetic coupling may be utilized to transfer power from a primary inductor in the charging base to a secondary inductor in the portable toothbrush.

Each of the primary and secondary inductors typically corresponds to a coil, where the turns ratio between the inductors may be N:1 or 1:N, where N is an integer number greater than zero. The number of turns for the primary and secondary inductors is selected to provide a mutual inductance sufficiently high so as to provide the desired amount of power to the portable device.

In many portable devices, space is a premium. As such, the gauge of wire selected for the inductor may be reduced to reduce the size of the inductor. The reduction in gauge, however, tends to increase the resistance of the inductor, which results in unwanted power loss in the inductor.

SUMMARY

In one aspect, a power circuit for wirelessly communicating power to a receiving device includes one or more switches for coupling respective ends of different coils of a group of coils together to facilitate selectively connecting the coils in a series configuration, parallel configuration, or combination thereof. The circuit includes a controller configured to control a conduction state of each of the one or more switches, and power terminals in electrical communication with the coils through which a power signal flows.

In a second aspect, a method for wirelessly communicating power to a receiving device includes coupling respective ends of different coils of a group of coils together in one of a series configuration, parallel configuration, or combination thereof to form a first configuration. The amount of power delivered to the receiving device is determined. The respective ends of different coils are coupled together in one of a series configuration, parallel configuration, or combination thereof to form a combination different than the first configuration based on the determined amount of power.

DETAILED DESCRIPTION

A power circuit that overcomes the problems above is disclosed in detail below. Generally, the power circuit is coupled to an inductor that includes a group of loops that are electrically separated from one another. The power circuit includes a group of switches for coupling the loops together in various configurations to change the inductance of the inductor and the resistance of the inductor. The power circuit monitors an amount of power delivered to a receiving device and reconfigures the inductor configuration to maximize power efficiency while maintaining a minimum amount of power transfer.

Figure 1A:
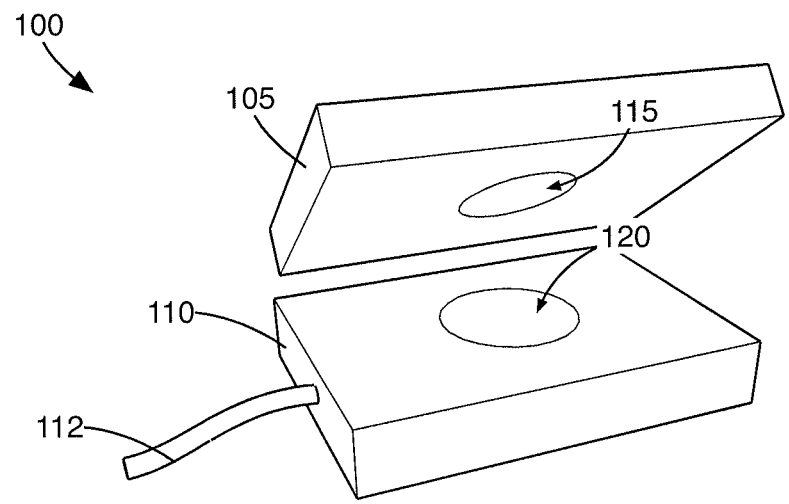
FIGS. 1A and 1B illustrate an exemplary charging base and a portable device.
Figure 1B:
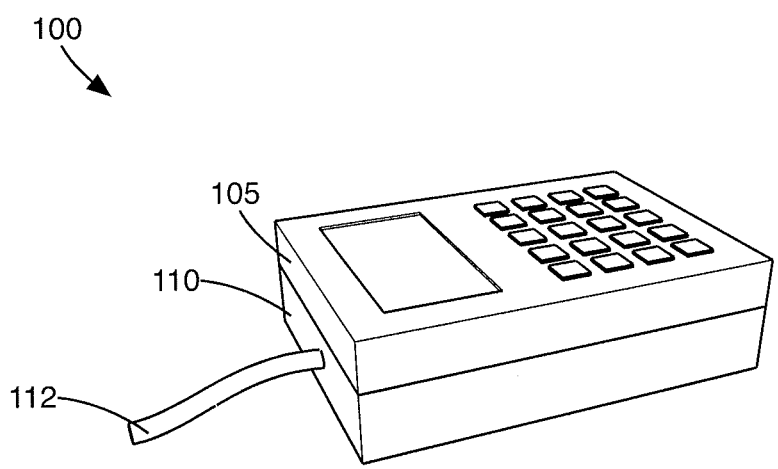

FIGS. 1A and 1B illustrate a wireless charging system 100 that includes a charging base 100 and a portable device 105 that is charged when placed over the charging base 100. The charging base 110 may derive power via a power cord 112 that is plugged into a power outlet (not shown) and may wirelessly communicate the power to the portable device 105.

To facilitate wireless charging, the charging base 110 may include a power circuit that includes a primary inductor disposed within a region 120 of the charging base 110 that, when aligned over a corresponding region 115 of the portable device 105 (See FIG. 1B), transfers power to a secondary inductor disposed within the portable device 105. Each inductor may correspond to a coil with N number of turns or loops. For example, the coil may correspond to a wire that is wrapped around an air core or a different core material a defined number of times, N, to provide N loops that collectively provide a desired inductance. The corresponding inductance is generally equal to the inductance of one loop times the square of the number of turns. Each loop contributes a portion of the total magnetic field generated by the inductor.

The amount of power transferred from the charging base 110 to the portable device 105 depends in part on the degree to which the respective inductors are aligned or overlap one another and the space between the respective inductors. Maximum power transfer occurs when the respective inductors completely overlap and are in the closest possible distance from one another.

Figure 2A:
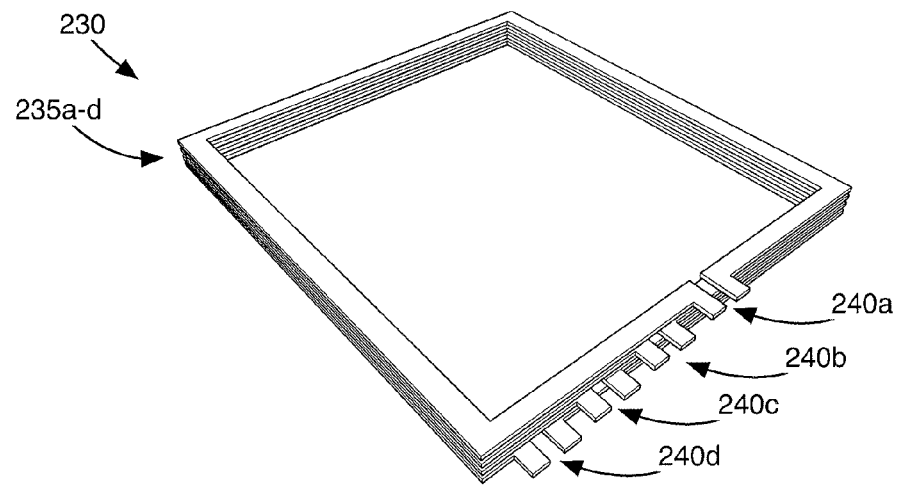
FIG. 2A illustrates an exemplary inductor that includes a group of loops that may be formed on a printed circuit board.

FIG. 2A illustrates one implementation of an inductor 230 that may correspond to either or both the primary and secondary inductors, described above. In an exemplary embodiment, the inductor 230 includes a group of loops 235a-d that may correspond to conductive traces disposed on one of several different layers of a printed circuit board (not shown). In alternative embodiments, two or more of the loops 235 a-d may be concentrically arranged on the same layer. The conductive material may correspond to a material such as copper in a specific embodiment. The material may be patterned to define a generally closed region with a pair of ends 240a-d. The pattern may define a square pattern, as illustrated, or a different pattern, such as a circular pattern, oval pattern, etc. The ends 240a-d of the loops 235a-d come together to provide contact points for soldering terminals to the loops 235a-d. The ends 240a-d may be coupled together in various combinations to facilitate coupling the loops 235a-d in a series configuration, parallel configuration, or a combination thereof. While FIG. 2A illustrates four loops 235a-d, it should be understood that the inductor 230 may include a different number of loops 235a-d and that the number of loops 235a-d *may be selected to attain a desired inductance.*

Figure 2B:
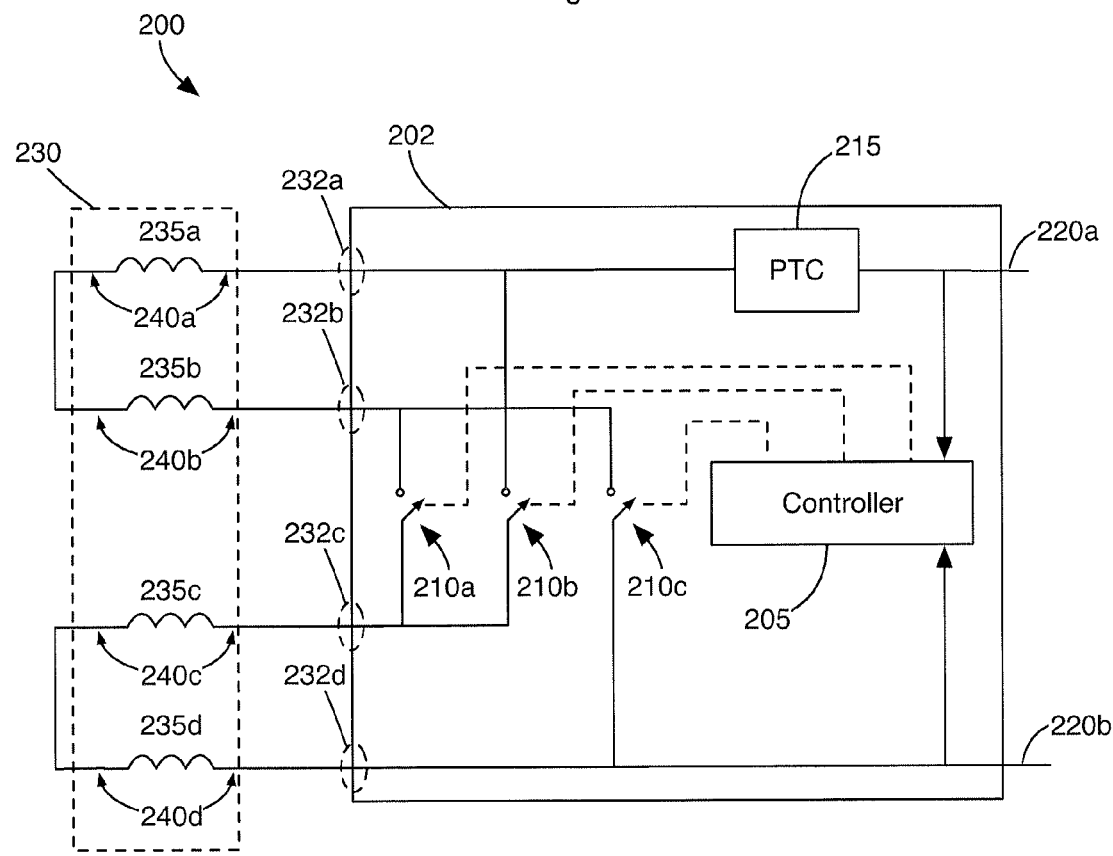
FIG. 2B illustrates an exemplary power circuit that interfaces with the inductor for communicating power.

FIG. 2B illustrates a power system 200 having an exemplary power circuit 202 that may be disposed within the charging base 110 and/or the portable device 105 for communicating power via the inductor 230. The power circuit 202 may include a controller 205, a group of switches 210a-c, power input pins 220a-b, and input/output ports 232a-d for coupling the power circuit 202 to the inductor 230. In some implementations, a protection device 215, such as a positive temperature coefficient (PTC) device, may be provided to guard against an over current condition. While three switches and four ports are illustrated, it should be understood that the number of switches and ports is merely exemplary and can be changed depending on the desired number of loops. For example, FIG. 2B illustrates an inductor 230 where some of the loops 235a-d are coupled together, while others are coupled to the inductor ports 232a-d. However, additional ports and switches may be provided so that a different number of ends 240a-d may be coupled to switches 210 to facilitate additional inductor configurations.

When utilized within the charging base 110, the controller 205 may be configured to determine an amount of power delivered to the portable device 105. For example, the controller 205 may include circuitry that facilitates measuring a phase difference between the voltage applied to the primary inductor 230 and the current flowing into the primary inductor 230. A phase difference close to or equal to 90 degrees may indicate an almost purely reactive load, meaning that no power is actually being delivered to a receiving device. On the other hand, a phase difference closer to 0 degrees may indicate that power is being delivered.

Additionally or alternatively, the controller 205 may be configured to determine the amount of power delivered based on feedback received from the portable device 105. For example, a message may be wirelessly communicated to charging base 110 from the portable device 105 indicating a power usage.

In yet other implementations, a different system may determine power usage via either method described above and may communicate signals to the controller 205 for controlling the switches 210a-c.

Figure 3:
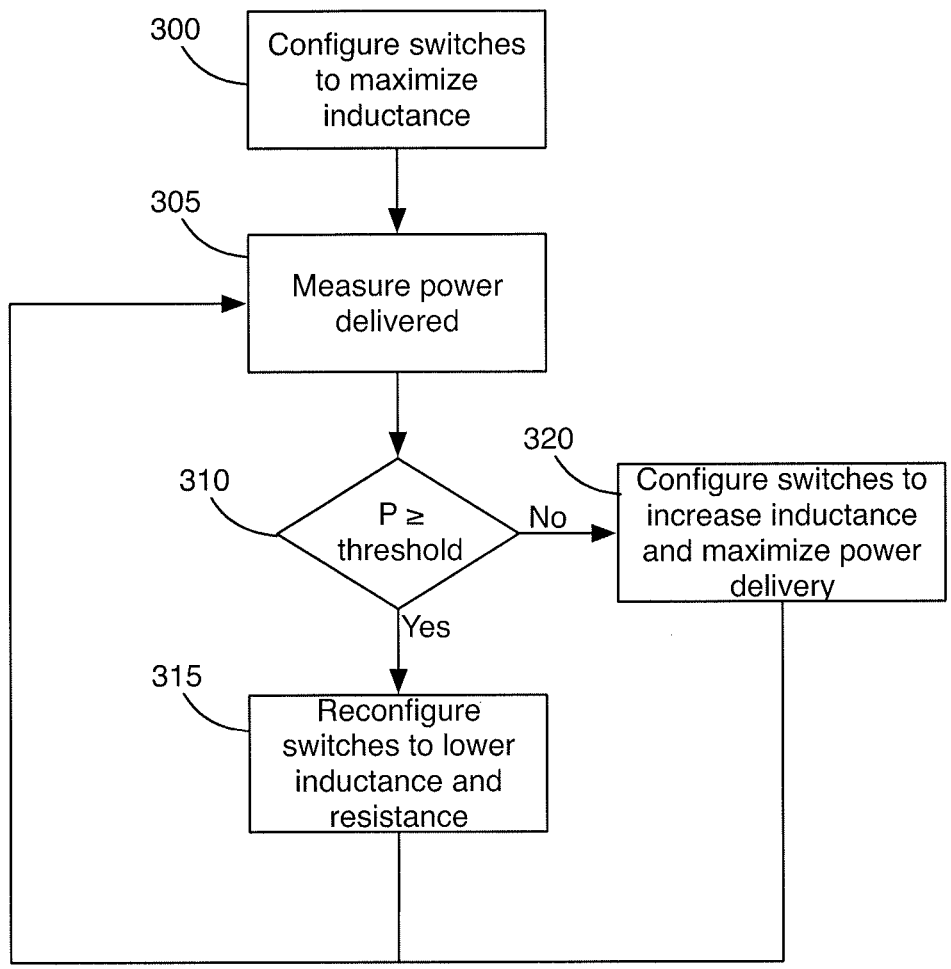
FIG. 3 illustrates exemplary operations that may be performed by the power circuit.
Figure 4:
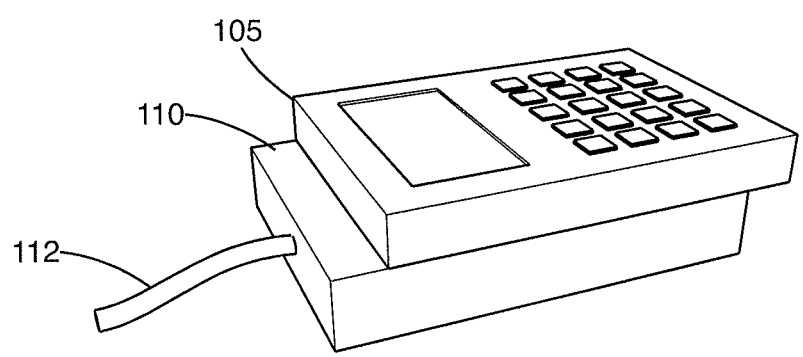
FIG. 4 illustrates the exemplary charging base and a portable device in an out-of-alignment configuration.

Operations of the power circuit 202 are described with reference to FIG. 3. At block 300, the switches 210a-c of the power circuit 202 may be initially configured to maximize the inductance of the primary inductor 230. For example, the controller 205 may control switch 210a to enter a closed or conductive state. The controller 205 may control switches 210b and 210c to enter an open or high resistance state. This configuration of the switches places the respective loops 235a-d in a series configuration, which maximizes the inductance of the primary inductor 230. The greater inductance results in a greater mutual inductance between the primary inductor 230 in the charging base 110 and the secondary inductor 230 in the portable device 105 and, therefore, increased power delivery to the portable device 105. This configuration advantageously relaxes the alignment requirements between the portable device 105 and the charging base 100 and facilitates charging the portable device when the respective units are somewhat out of alignment, as illustrated in FIG. 4. For example, the inductance, and therefore the amount of power delivered, may be set to be about 20 µH (microHenry), which may be sufficient to facilitate charging or activating the portable device 105 when the respective inductors overlap by about 10%. In this configuration, the resistance of the inductor may be about 0.5 ohms.

At block 305, the amount of power delivered to the portable device 105 is determined. For example, the controller 205 may determine the power delivered by measuring the phase difference between the voltage across the primary inductor and the current flowing through the primary inductor. The controller 205 may receive a signal from the portable device 105 indicative of the power being utilized by the portable device 105. The power delivered may be determined via different operations.

At block 310, if the power being delivered is determined to be above a threshold, then at block 315, the switches 210a-d may be reconfigured as seen in block 315 to lower the inductance of the primary inductor 230. For example, if batteries in the portable device 105 have a relatively high charge, maximum charging power may not be required. In this case, the switches 210a may be set to an open or non-conductive state, and switches 210b-c may be set to a closed or conductive state. In this configuration, the loops 235a-d of the primary inductor 230 are arranged in a parallel configuration. This results in both an overall decrease in the inductance of the inductor and a decrease in the resistance of the primary inductor 230. For example, the inductance may decrease to about 4 µH and the corresponding resistance may decrease to about 0.1 ohms. The reduced resistance results in a decrease in power loss across the primary inductor 230, which ultimately improves the overall efficiency of the power circuit 202.

As described above and illustrated in the figures, the power system 200 overcomes the problems associated with existing wireless power systems by reconfiguring the loops of an inductor 230 based on an amount of power being delivered or required by a portable device 105. When the required power falls to or below a threshold, the inductor 230 may be reconfigured as seen in block 320 to lower the resistance of the inductor 230, thus improving the efficiency of the power system 200.

Figure 5A:
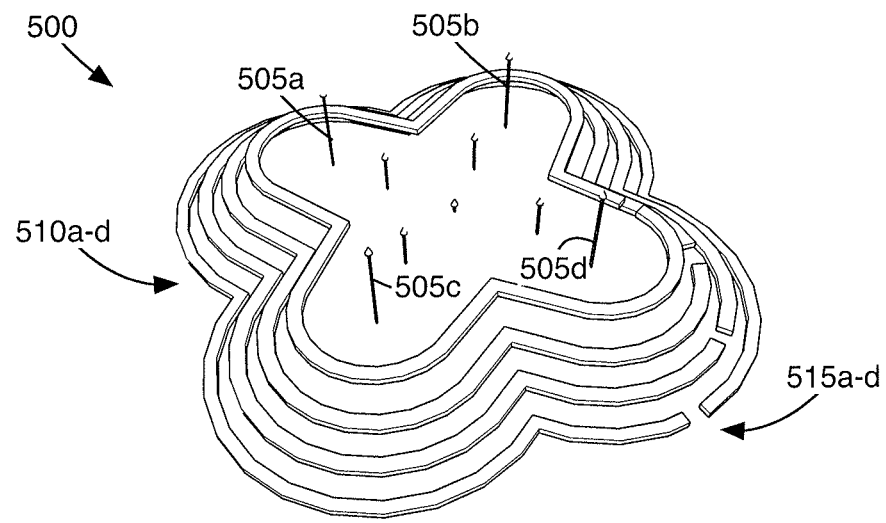
FIGS. 5A-5C illustrate a second exemplary inductor that may be utilized with the exemplary power circuit for communicating power.

In an alternative embodiment, a different inductor may be utilized to enhance the functioning of the power system 200. For example, FIG. 5 illustrates an exemplary alternative primary inductor 500 configuration that may be disposed within the charging base 110 and utilized with the described power circuit 202. The inductor 500 has a clover shape with a group of loops 510a-d that may be disposed on different layers of a printed circuit board or may be disposed on a single layer. Each loop may have a pair of ends 515a-d that facilitate coupling the inductor 500 to the power circuit 202, described above. Additionally or alternatively, some of the ends 515a-d may be coupled together.

The inductor 500 concentrates the magnetic field into four different lobes 505a-d of the inductor 500, as illustrated by the arrows. Taller arrows indicate stronger magnetic fields. This is different from an inductor with a square or circular pattern, which tends to concentrate the magnetic field towards a single zone in the center of the inductor.

Figure 5B:
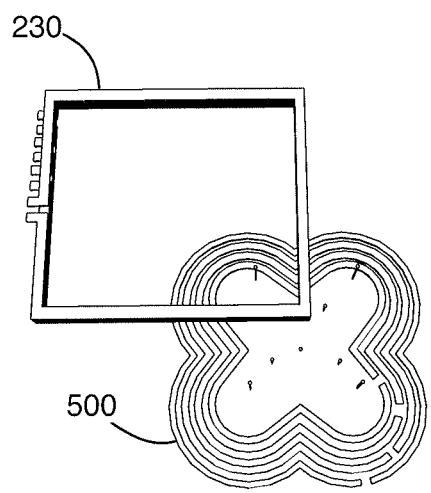
Figure 5C:
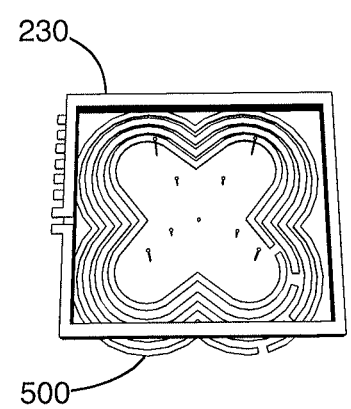

The clover-shaped inductor 500 advantageously relaxes the alignment requirements of the portable device 105 and the charging base 110 further, because the secondary inductor 230 of the portable device will begin to receive power as soon the secondary inductor passes over any one of the lobes 505a-c, as illustrated in FIG. 5B. For example, 25% of the power may be available when the respective inductors overlap by about 25%. Maximum power transfer is realized when the secondary inductor 230 is in complete alignment with the clover-shaped inductor 500, as illustrated in FIG.

5C. This is different from a primary inductor having a square or circular shape, where an overlap of about 25% will result in 10% of the power being transferred. While a clover shaped inductor 500 is illustrated, it should be understood that the shape of the inductor may be configured to concentrate the magnetic field into a different number of regions. For example, an oval shaped inductor may concentrate the magnetic field into two zones. An inductor shaped with five lobes may concentrate the magnetic field within the five lobes. The shape may be tailored as necessary to operate within a given environment.

While the power system 200 has been described with reference to certain embodiments, it will be understood by those skilled in the art that various changes may be made and equivalents may be substituted without departing from the spirit and scope of the claims of the application. Various modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

We claim:

1. A power circuit for wirelessly communicating power to a receiving device comprising:
   one or more switches for coupling respective ends of different coils of a plurality of coils together to facilitate selectively connecting the plurality of coils such that in a first switch configuration the plurality of coils are in a series configuration, in a second switch configuration the plurality of coils are in a parallel configuration, and in a third switch configuration some of the plurality of coils are in a series configuration and other coils of the plurality are in a parallel configuration;
   a controller configured to control a conduction state of each of the one or more switches; and
   first and second power terminals in electrical communication with the plurality of coils through which a power signal flows.

2. The power transmission circuit of claim 1, wherein the plurality of coils overlap one another and are substantially centered with one another to thereby concentrate a magnetic field in a first direction towards the receiving device.

3. The power transmission circuit of claim 2, wherein each coil corresponds to a single loop of conductive material that is disposed on a different layer of a printed circuit board.

4. The power transmission circuit of claim 1, wherein the controller is configured to determine an amount of power delivered to the receiving device.

5. The power transmission circuit of claim 4, wherein the controller determines the amount of power delivered based on a phase difference between a voltage and current phase of the power signal.

6. The power transmission circuit of claim 4, wherein the controller determines the amount of power delivered to the receiving device based on a signal received from the receiving device indicative of an amount of power received at the receiving device.

7. The power transmission circuit of claim 4, wherein when the power delivered is below a threshold, the controller is configured to control the conduction state of the plurality of switches to maximize power delivery.

8. The power transmission circuit of claim 7, wherein the controller is configured to control the conduction state of the plurality of switches to connect the plurality of coils into a series configuration to maximize power delivery.

9. The power transmission circuit of claim 4, wherein when the power delivered is at or above a threshold, the controller is configured to control the conduction state of the plurality of switches to maximize a power efficiency of the power transmission circuit.

10. The power transmission circuit of claim 9, wherein the controller is configured to control the conduction state of the plurality of switches to connect at least some of the plurality of coils into a parallel configuration to maximize power efficiency.

11. The power transmission circuit of claim 1, wherein a shape of the plurality of coils defines two or more lobed regions in which a magnetic field generated by the plurality of coils is concentrated.

12. A method for wirelessly communicating power to a receiving device, the method comprising:
    coupling respective ends of different coils of a plurality of coils together in one of a series configuration, parallel configuration, or combination thereof to form a first configuration;
    determining an amount of power delivered to the receiving device;
    coupling the respective ends of different coils of the plurality of coils together in one of a series configuration, parallel configuration, or combination thereof to form a combination different than the first configuration based on the determined amount of power.

13. The method for wirelessly communicating power of claim 12, wherein the plurality of coils overlap one another and are substantially centered with one another to thereby concentrate a magnetic field in a first direction towards the receiving device.

14. The method for wirelessly communicating power of claim 13, wherein each coil corresponds to a single loop of conductive material that is disposed on a different layer of a printed circuit board.

15. The method for wirelessly communicating power of claim 12, further comprising determining the amount of power delivered based on a phase difference between a voltage and current phase of the power signal.

16. The method for wirelessly communicating power of claim 12, further comprising determining the amount of power delivered to the receiving device based on a signal received from the receiving device indicative of an amount of power received at the receiving device.

17. The method for wirelessly communicating power of claim 12, wherein when the power delivered is determined to be below a threshold, the method further comprising coupling respective ends of different coils of the plurality of coils together to form a configuration that maximizes power delivery.

18. The method for wirelessly communicating power of claim 17, wherein the respective ends of the plurality of coils are coupled together to form a series configuration to maximize power delivery.

19. The method for wirelessly communicating power of claim 12, wherein when the power delivered is determined to be at or above a threshold, the method further comprising coupling respective ends of different coils of the plurality of coils together to form a configuration that maximizes power efficiency.

20. The method for wirelessly communicating power of claim 18, wherein the respective ends of the plurality of coils are coupled together so that at least some of the plurality of coils are coupled together in a parallel configuration to maximize power efficiency.

21. A system that includes a charging station and a device to be charged in the charging station, wherein at least one of the charging station and the device to be charged comprises the circuit of claim 1.

* * * * *